July 1, 1930.  E. B. ALLCUTT  1,769,482
RUBBER CUSHION BEDPAN
Filed July 16, 1929  2 Sheets-Sheet 1
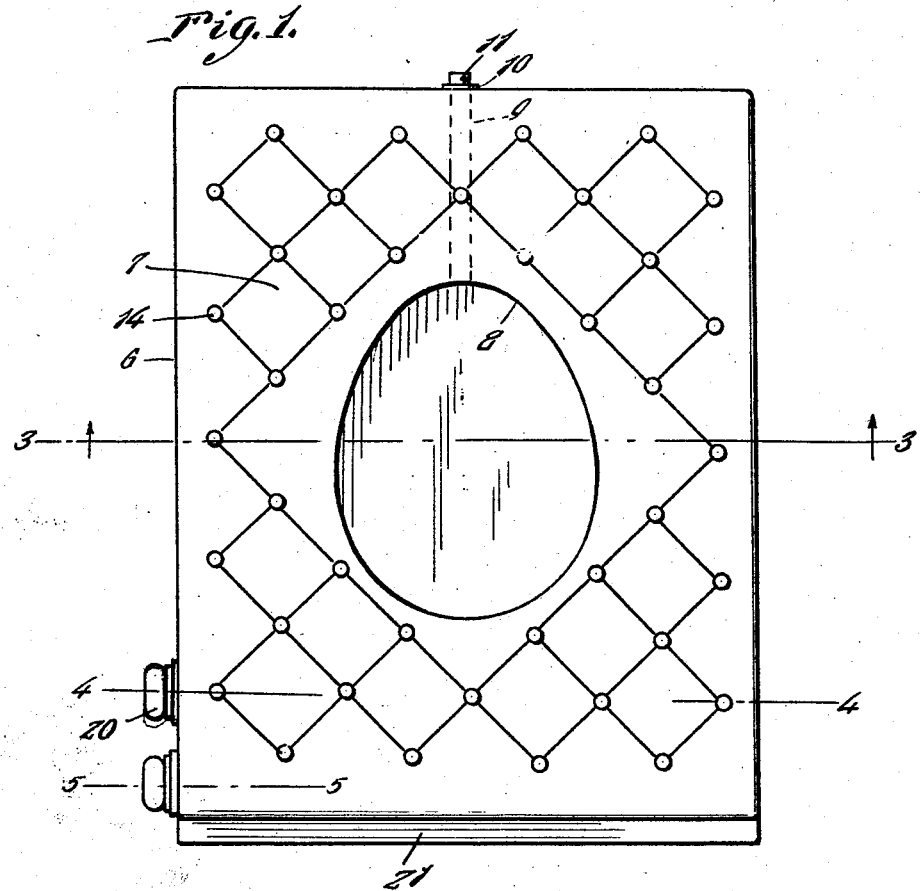
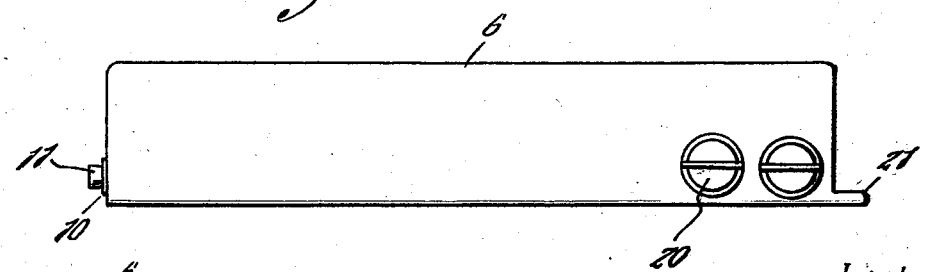
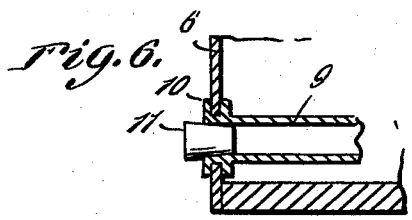
Inventor
Elwood B. Allcutt
By Clarence A. O'Brien
Attorney July 1, 1930.  E. B. ALLCUTT  1,769,482
RUBBER CUSHION BEDPAN
Filed July 16, 1929   2 Sheets-Sheet 2

Inventor
Elwood B. Allcutt

By Clarence A. O'Brien
Attorney

Patented July 1, 1930

1,769,482

UNITED STATES PATENT OFFICE

ELWOOD B. ALLCUTT, OF PLAINFIELD, NEW JERSEY

RUBBER-CUSHION BEDPAN

Application filed July 16, 1929. Serial No. 378,707.

This invention relates to a bed pan and has for its prime object to provide a structure of this nature which is exceedingly simple, inexpensive to manufacture, strong and durable, comfortable, compact and convenient, thoroughy efficient and reliable in use, and otherwise well adapted to the purpose for which it is designed.

With the above and numerous other objects in view, as will appear as the description proceeds, the invention resides in certain novel features of construction, and in the combination and arrangement of parts as will be hereinafter more fully described and claimed.

In the drawings:

Figure 1 is a top plan view of the bed pan embodying the features of my invention.

Figure 2 is a side elevation thereof.

Figure 6 is a fragmentary detail section, showing the outlet end of the drain conduit.

Figure 3:
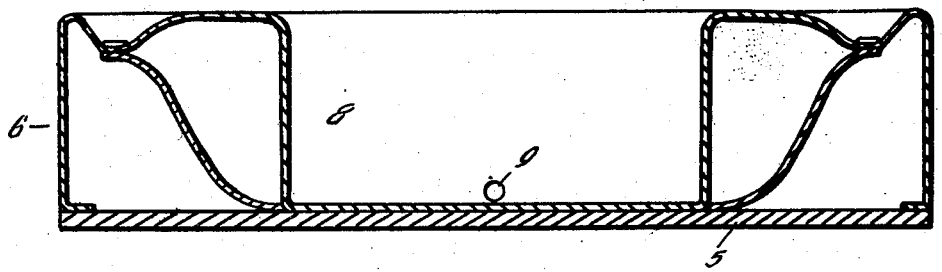
Figure 3 is a transverse section taken substantially on the line 3—3 of Figure 1.
Figure 4:
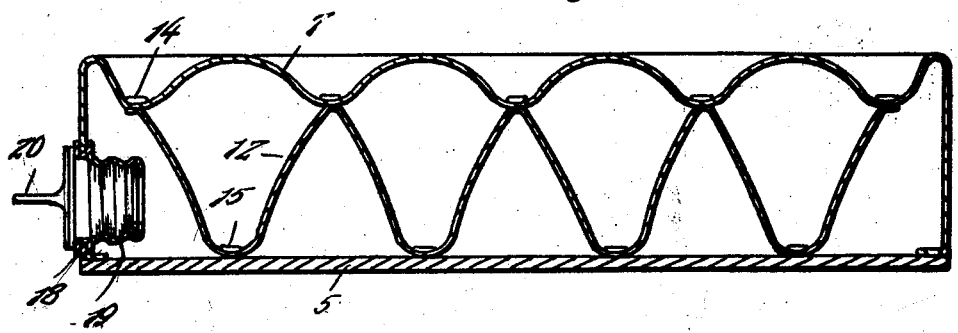
Figure 4 is another transverse section, taken substantially on the line 4—4 of Figure 1.
Figure 5:
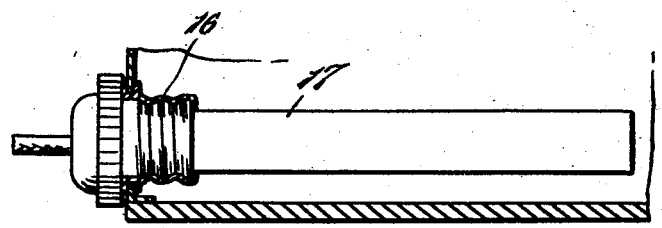
Figure 5 is an enlarged detail section, taken substantially on the line 5—5 of Figure 1.

Referring to the drawing in detail, it will be seen that the numeral 5 denotes a base made of hard rubber and forming the bottom of the bed pan and to the edge of this base 5 which is preferably rectangular, there is attached rubber side walls 6 which merge into a top structure 7, which in turn merges into a well, compartment, or receptacle portion 8 of substantially ovoidal or egg-shaped configuration located approximately in the center of the base 5 and having a drain conduit 9 leading therefrom through one end wall 6, being mounted therein as indicated at 10 and having a removable plug 11 associated therewith. The top 7 is propped by means of a zig-zag partition structure 12 which is fastened thereto as at 14 and to the base as at 15 to form cells. A threaded neck 16 is mounted on the side walls so that an electrical heater 17 may be inserted within the pan, the plug of which heater may be threaded in the neck 16 for securely holding the heater within said pan. On said one side wall, adjacent the threaded neck 16, the pan is provided with a filling opening 18, within which opening 18 there is mounted a threaded neck 19 so that a closure plug 20 may be threaded therein or when the plug is removed a suitable pump may be attached to the neck 19 to pump the pan up.

At one end, the bottom or base of the pan is extended to provide a transversely extending ledge 21, which ledge 21 may be gripped by the hand to facilitate the placing or removal of the pan beneath the body of the patient. The extension 21 constitutes as it were, a handle for the pan.

This bed pan is adapted for use in douching or irrigation by the hour, or dressing of wounds on any part of the body, head, neck, or extremities. Hot or cold water may be used in the device to form a hot or cold water pad, or just air may be used to form an air cushion. In giving an enema, the device may be used as a hot water pad, or cushion under the patient's back or hips which tends to draw the blood to the spine and thus the bowels and will cause them to function better and quicker.

Furthermore, this pan permits the adjusting by deflation or inflation under the helpless or suffering patient without having to move or disturb the patient to any great or annoying degree.

With the firm rigid base or bottom, the ends of the pan that extend beyond the patient's hip will not turn up against the thighs of the patient. It will be noted that the pan is light in weight, small in bulk, and easy to carry when deflated.

It is thought that the construction, operation, utility and advantages of the invention will now be quite apparent to those skilled in this art without a more detailed description thereof.

The present embodiment of the invention has been disclosed in considerable detail, merely for the purpose of exemplification, since in actual practice, it attains the features of advantage enumerated as desirable in the statement of the invention and the above description.

It will be apparent that changes in the details of construction, and in the combination and arrangement of parts may be resorted to, without departing from the spirit or scope of the invention as hereinafter claimed, or sacrificing any of its advantages.

What is claimed as new is:

A bed pan comprising a rigid base, a flexible, inflatable, hollow, cushioning portion connected to and disposed above the base and having a receptacle and also having a filling opening in communication with its interior and means for normally closing said opening, and a heating element in said hollow portion for maintaining its fluid contents in a heated state.

In testimony whereof I affix my signature.

ELWOOD B. ALLCUTT.